FIG. I
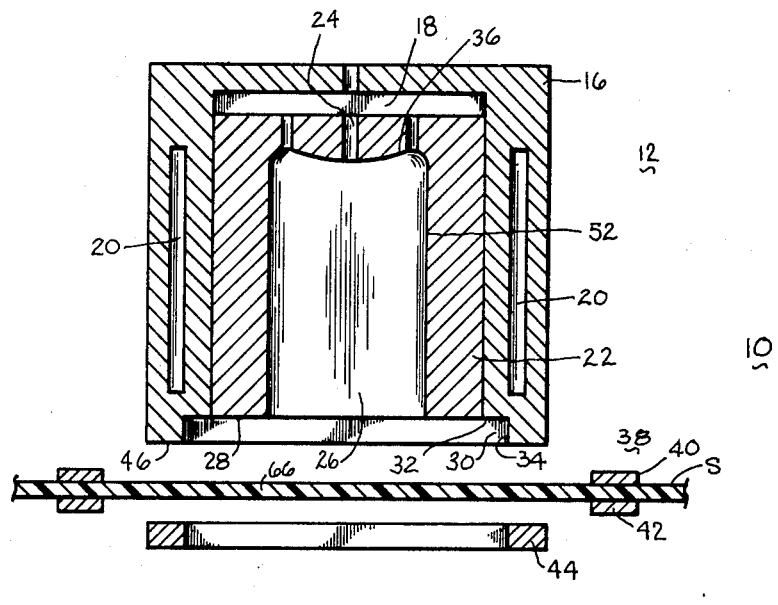
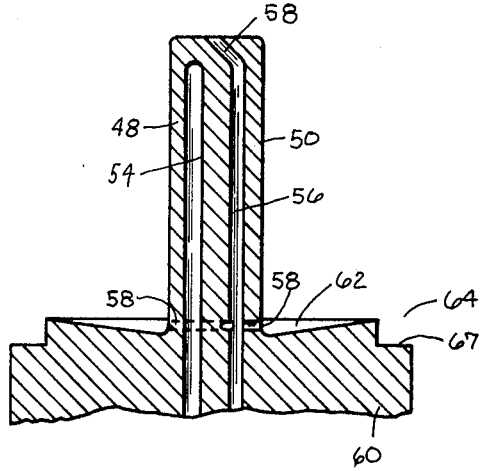
INVENTOR
WILLIAM D. WOLF
BY
Michael J. Murphy
ATTORNEY

INVENTOR
WILLIAM D. WOLF

United States Patent Office 3,737,494
Patented June 5, 1973

3,737,494
FORMING DEEP MOLECULARLY ORIENTED ARTICLES FROM HIGH NITRILE GROUP CONTAINING POLYMERS
William D. Wolf, Simsbury, Conn., assignor to Monsanto Company, St. Louis, Mo.
Filed Feb. 8, 1971, Ser. No. 113,576
Int. Cl. B29c 17/04
U.S. Cl. 264—89
8 Claims

ABSTRACT OF THE DISCLOSURE

A method of forming articles having relatively balanced molecular orientation from a special type of thermoplastic sheet composed of at least 60 weight percent of a polymer formed from a nitrile group containing monomer, which includes forcing the thermoplastic by means of a plug in an axial direction at a sheet temperature within the range of from about 311 to 390° F., which temperature is above that at which substantial orientation occurs, in order to partially form the article while minimizing development of axial orientation, holding the thus forced material in contact with a surface at a temperature of from about 250 to 310° F. to reduce the temperature of the material to orientation temperature and then expanding the material outwardly against the walls of a mold cavity to obtain radial orientation and finish form the article.

BACKGROUND OF THE INVENTION

The present invention relates to a method of forming hollow articles such as containers from a special type of thermoplastic sheet material, and more particularly to a plug assist method of forming such articles having relatively balanced molecular orientation developed therein.

It is well known to form articles such as containers by forcing a heat softened sheet portion with a plug into a die cavity and then expanding the sheet outwardly into contact with the cavity surface. As is also known, forming from sheet is not the only method of making such articles. Other techniques involve injection molding the plastic either directly into finished article form or blow molding an injection molded preform into the shape of the finished article. Yet another way involves extruding a tubular preform and then expanding it within a blow mold to finish form the article. With respect to thermoplastics usable in these processes, there has recently been developed a family of materials which are especially suitable for use as packaging containers for holding environmentally sensitive products such as food, cosmetics, pressurized fluent materials such as carbonated beverages, beer, aerosols, and the like. Typical thermoplastics within this family are disclosed in Ser. No. 776,250, filed Nov. 15, 1968 and assigned to the assignee of the present invention, and may be generically described as thermoplastics comprising at least 60 weight percent of a polymer formed from a nitrile group containing monomer, such as, for example, methacrylonitrile. Such thermoplastics are especially suitable for effectively holding such environmentally sensitive products because of their extremely low permeability to gases and liquids, their essentially color free nature and their general inertness to the contents, meaning that no noticeable taste is imparted to or lost from the contents during normal shelf life periods.

It is likewise known, as brought out in the previously mentioned copending application, that these thermoplastics tend to be brittle and fracture prone because of the nature of the major nitrile group containing constituent of the polymer. Also set out in said appliction, is the fact that when such thermoplastics are stretched, the molecules become oriented and the resulting material has considerably greater strength and toughness than previously. However, if stretching occurs only or predominantly in a single direction, the material is relatively weak in a direction transverse to the stretch direction. Accordingly, when containers are formed by stretching such plastics predominantly in the axial direction, it has been found that they will split or fiber when squeezed transverse to the axial direction. In cases where it is possible to work the material during forming by multi-directional stretching to an extent which is relatively uniform in each direction, more nearly uniform strength in all directions accordingly would be expected to be obtained.

Control of the degree of orientation in the axial and radial directions may be achieved by various means in straight blow molding or injection-blow molding processes. In either case a tubular preform is shaped at a relatively high temperature whereat the plastic is in a relaxed relatively unoriented condition. The tubular shape in these systems approaches that of the finished article when the latter is a container such as a bottle or a can, and only final expansion of the preform is required to finish form the article. By regulating the length of the parison or preform with respect to the height of the finished article, or with respect to the height of the mold cavity which defines the article during final expansion, the amount of orientation in the axial direction with respect to that in the transverse or radial direction can be fairly accurately controlled.

However, injection and extrusion blow molding techniques have some serious disadvantages when compared with the technique of thermoforming from sheet material. More specifically, injection molding requires the generation of unusually high pressures and consequently temperatures in order to force the thermoplastic into relatively narrow cavities which are equivalent to or approach the desired article wall thickness. Aside from the heavy equipment required, the rather severe processing conditions tend to degrade high nitrile group containing polymers or, put another way, such materials tend to be too stiff in flow at acceptable processing conditions to force into such confined spaces. With straight extrusion-blow molding (as well as injection molding) systems, output is limited to the extent that only one or two articles may be simultaneosuly formed from a parison portion, whereas a great many articles, e.g. up to 50, may be formed from sheet material in an approximately equivalent time when a suitable number of cavities are provided. Since the temperature of the sheet need only be great enough to permit forcing it through the open mouth of a die cavity, the severe processing conditions and heavy equipment inherent in an injection molding system are avoided. However, to form a deep article, such as a bottle or can, from a sheet of high nitrile group containing thermoplastic which has relatively balanced molecular orientation therein, has heretofore been a problem. This was so, because, unlike blow and injection molding techniques, a preform must be shaped from a flat, planar sheet by forcing the latter a substantial distance into the die cavity such that the amount of orientation in the axial direction in the finished article was always substantially greater than that in the other direction. This of course acts as a detriment when the container is to be used, for example to contain pressurized materials where high strength in all directions is required, and/or where, for example, a closure must be applied to the container by a high axial load producing capping head.

One approach toward overcoming this problem of unbalanced molecular orientation when forming containers from sheet thermoplastics of the aforementioned variety is to shape the sheet at a sufficiently high temperature such that orientation stresses in the axial direction are not retained therein. However, when the thermoplastic sets, the undesirable, inherent brittle characteristic of the material is still present. Yet another alternative would be to change the resin formulation to make it more pliable in order to offset the considerable axial orientation developed during drawing, but this requires additional steps in the resin forming process and, in any event, the modifier may render the resin deficient in other characteristics such as color, or it may adversely affect the flavor or taste of the contents.

SUMMARY OF THE INVENTION

Now, however, there has been discovered a novel technique for shaping relatively deep articles from sheet thermoplastic, the major constituent of which is a high nitrile group containing polymer, wherein the articles have much more balanced molecular orientation therein than that attainable according to prior art techniques.

Accordingly, it is an object of this invention to provide a modified and improved plug assist method of forming deep articles from thermoplastic sheet material comprising a high nitrile group containing polymer, "high" meaning a level of at least 60 percent by weight of a polymer formed from a nitrile group containing monomer.

Another object of this invention is to provide a method of forming tubular, relatively thin wall containers, from high nitrile group containing thermoplastics in sheet form which have high strength both longitudinally and transversely.

Another object of this invention is to provide a method of balancing the amount of molecular orientation developed in a sheet of thermoplastic of the aforementioned composition during forming of deep hollow articles therefrom.

A further object of this invention is to provide a novel combination of temperature dependent molding steps in a plug assist process of forming from sheet material of the aforementioned composition to affect an improvement in the strength properties of the finished articles.

An additional object of this invention is to provide a plug assist thermoforming process for shaping articles having a substantially improved balance of axial and circumferential molecular orientation which utilizes conventional apparatus components requiring little or no revision.

Other objects of this invention will in part be obvious and will in part appear hereinafter.

These and other objects are accomplished in a plug assist thermoforming process for forming a deep hollow article from a thermoplastic comprising at least 60 percent by weight of a nitrile group containing polymer, which includes expanding a portion of the thermoplastic outwardly off the plug against the surface of a mold cavity, by providing the improvement which comprises forcing the thermoplastic in an axial direction while at a temperature within the range of from 311 to 390° F. to partially form the article while minimizing development of axial orientation in the thermoplastic and then holding the sheet portion in contact with a cooling medium at a temperature within the range of from 250 to 310° F. to reduce the temperature of the material prior to expanding it outwardly against the surface of the mold cavity. In this way, the relatively long stretch of the sheet in the axial direction is carried out at a relatively (yet not excessively) high temperature in comparison with the shorter stretch in the radial direction in reaching the cavity wall, this latter movement being carried out at a lower material temperature thereby providing an overall improvement in the balance between axial and circumferential or radial orientation in the finished article.

BRIEF DESCRIPTION OF THE DRAWINGS

In describing the overall invention, reference will be made to the accompanying drawings wherein:

FIGS. 1–5 are partial, sectional views of apparatus used in the present invention illustrating the position of the sheet during successive steps in the overall process.

DETAILED DESCRIPTION OF THE INVENTION

Figure 2:
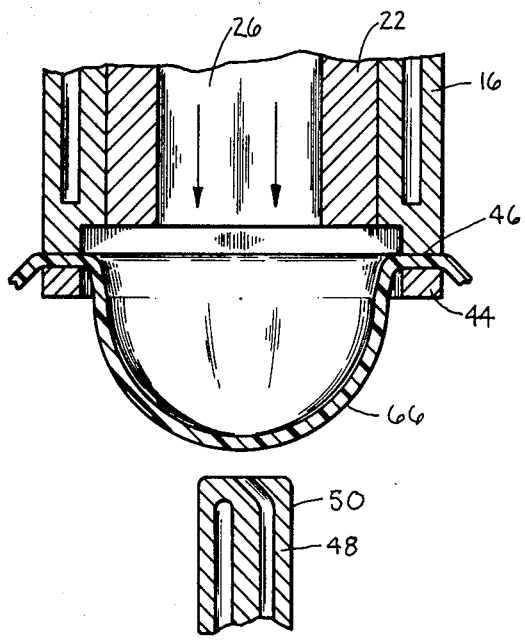

Referring now to the drawings, there is shown in FIG. 1, a thermoforming assembly 10 capable of forming relatively deep articles, such as containers in the form of cans having a capacity of 4 oz. or more, from thermoplastic sheet material S. Sheet S has previously been formed in a conventional manner from a resin blend of 98 weight percent of copolymerized methacrylonitrile and styrene, the methacrylonitrile being present in the copolymer to the extent of 90 weight percent and the styrene to the extent of 10 weight percent, 1 weight percent of epoxidized soya bean oil (lubricant) and 1 weight percent of calcium zinc stearate (stabilizer).

Thermoforming assembly 10 includes mold assembly 12 and plug assembly 14. Mold assembly 12 comprises mold adapter block 16 having passages 20 formed therein which are conventionally connected by conduit means (not shown) to a source of cooling medium supply utilized to set the plastic after forming the article by circulation through passages 20. Mold assembly 12 further comprises mold 22 suitably fastened in adapter block 16 by conventional means (not shown). Mold 22 has a series of channels 24 formed therein opening at one end into cavity 26 and communicating at the other end with passage 18 formed between the base of mold 22 and the opposing wall of block 16. Passage 18 is connected conventionally to a source of pressurized fluid such as air (not shown) and may be connected as well to the atmosphere or to a source of reduced pressure by suitable conventional valving. Adapter block 16 adjacent rim 28 of mold 22 has a step 30 formed therein which includes horizontal portion 32 and vertical portion 34. The walls 52 defining the sides of cavity 26 of mold 22 extend vertically from base 36, though it should be understood that they may diverge outwardly from base 36 if desired.

Supporting frame 38 is provided between mold assembly 12 and plug assembly 14 and comprises a pair of upper and lower opposed cooperating jaws 40 and 42 respectively. Clamping ring 44 is provided adjacent supporting frame 38 which is in vertical alignment opposite surface 46 of adapter block 16.

Plug assembly 14 includes plug 48 which has an axially extending surface 50 which is parallel to the sidewalls 52 of mold 22. Should cavity sidewalls 52 be sloped, then surface 50 could likewise be sloped in the same direction but could be straight or non-parallel depending on the amount of orientation desired to be selectively generated in a particular portion of the article in the manner to be hereafter described. Plug 48 has a cavity 54 formed therein for accommodating conventional means, such as a cartridge resistance heater (not shown), for maintaining surface 50 at a predetermined temperature. It should be understood that alternative means may be employed for controlling the temperature of surface 50, for example, passages through which a suitable heat exchange fluid is circulated. Also formed within plug 48 is a passage 56 having a series of branches 58, each of which opens at one end onto surface 50 of plug 48. Passage 56 is connected to both a source of reduced pressure and to a source of super atmospheric pressure by means of conventional valve means not shown and well known to those skilled in the art. Plug assembly 14 further comprises a base portion 60 having a shallow recess 62 formed therein adjacent the lower or trailing end of plug 48. Shoulder 64 is provided about the periphery of base 60, surface 67 thereof being vertically aligned opposite clamping ring 44.

In operation, thermoplastic sheet S composed of the previously described high nitrile group containing polymer, in a generally molecularly unoriented condition, is supported about its periphery between jaws 40 and 42 of supporting frame 38 opposite the mouth of mold cavity 26. Sheet S, and necessarily the portion 66 thereof within the supported periphery, at this stage of the process is at a temperature of 360° F., which generally requires that it be heated for example, by conventional means such as an infra-red heater, not shown. It may, however, require cooling, for example when the sheet has just issued from an extrusion die, such cooling also being accomplished by known means, for example by passing the sheet through a conventional roll type sheet tempering apparatus (not shown). The upper limit of the temperature of the sheet at this point in the process (FIG. 1) should be less than the extrusion temperature, since it is necessary that the thermoplastic be able to retain its sheet shape without unduly sagging and also be able to retain some molecular orientation when stretched. Such a sheet temperature for high nitrile group containing polymers in general will lie within the range of from 311 to 390° F. The extrusion or melt working temperature of such high nitrile group containing polymers is within the range of from 425 to 560° F., while the temperature at which substantial molecular orientation of such polymers occurs on stretching, the latter to be described more completely hereafter, is within the range of from 250 to 310° F.

In the apparatus embodiment of the drawings, clamping ring 44 is now moved by suitable conventional means into and against the sheet adjacent the supported periphery to force a circumferentially extending band of portion 66 inwardly of jaws 40 and 42 against surface 46 of adapter block 16 adjacent the mouth of mold cavity 26. Alternatively, this particular manner of clamping may be avoided and the portion 66 acted on by the plug as hereafter described, while held between jaws 40 and 42, or, according to yet another alternative, the sheet may be clamped directly against surface 46 without employing jaws 40 and 42.

Pressurized fluid, such as air at a pressure of, for example, 2–15 p.s.i., is now introduced from a suitable source through passage 18, channels 24 and cavity 26 of the mold assembly 12 (FIG. 2) and against the side of sheet S facing mold assembly 12, thus serving to stretch portion 66 and causing it to billow in a direction away from the mouth of mold cavity 26. Such stretching action at the preselected temperature described previously will thin and accordingly increase the surface area of the sheet portion within the clamped and supported periphery by some 20 to 150 percent. If the clamped and/or supported periphery of sheet S is considered to be circular in form prior to stretching, the portion 66 after such stretching will be in the form of a hemisphere which necessarily has an increased surface area over that existing previously because of the stretching and resulting thinning of the sheet. This surface area enlargement can be considered to be characterized by a series of peripherally extending surface elements originating at the center of the hemisphere which originally were radii of the flat sheet. Also, as will be further explained hereafter, material defining the increased surface, though at this point in the process extending more in a radial direction with respect to the axis of the mold cavity or container, will, after the action of plug 48 extend generally in a direction along the axis of cavity 26. As an important part of the present invention, it should be noted that this initial stretching of the sheet away from the mouth of the die cavity while within a preselected temperature range is basically responsible for development of the molecular orientation in the axial direction in the finished container, since the sheet is at a temperature at which some, but not substantial orientation can be developed on stretching.

Figure 3:
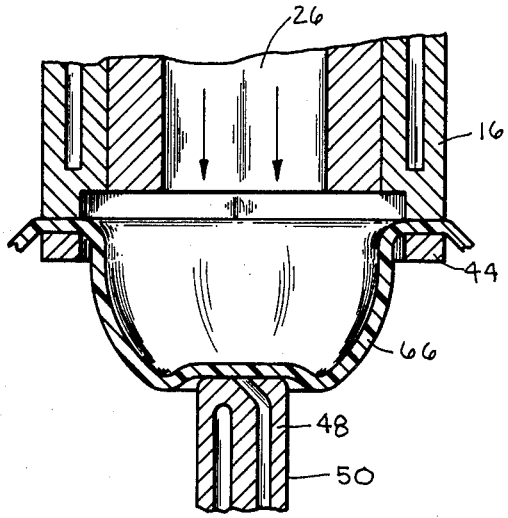
Figure 4:
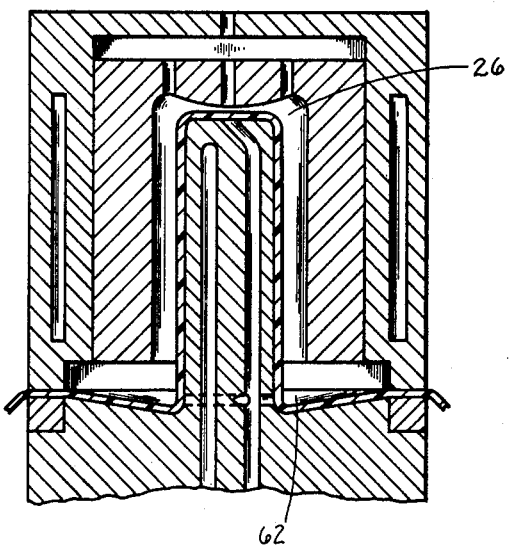

After the sheet has been thus billowed, plug 48 (FIGS. 3 and 4) is caused to rapidly advance into portion 66 to move it into cavity 26 preferably without contacting the cavity surface. Plug 48 and cavity 26 are so dimensioned with respect to each other that when the advancing movement of plug 48 is terminated, the sheet is still spaced from the opposing die walls (FIG. 4). Also (FIG. 4), the length of the plug measured from top to bottom (excluding base portion 60) should preferably be equal to or greater than the length in the same direction of the container surface defining portion of cavity 26, or in other words, that portion forward of step 30. When this relationship is maintained, substantially no further orientation in the axial direction will occur during final forming of the container. Also, rim surface 28 and step surfaces 32 and 34, which together define a relieved increased surface area of the mold assembly rearward of cavity 26, serve to prevent any ripples from forming in the container during final expansion; these ripples would otherwise occur if the surface area of the base of the plug, as defined by the surface in FIG. 1 forming depression 62, was more than that of the surface area of the rearward end of the cavity adjacent the mouth, or, in other words, if the relief area were not provided in the cavity. The cutaway shape of the mold cavity around its mouth as defined by step 30 also assists in keeping the sheet away from the cavity surface in the mouth area during this movement into the cavity. Though movement of the sheet during this stage of the process is shown in the drawings as into a die cavity, it should be understood that such axial movement could be carried out independently of, or in other words outside of a surrounding mold and then the plug could be positioned within the cavity after impaling the sheet on the plug surface as will be further described hereafter.

As can be recognized, the molecular orientation extending in the radial direction with respect to the die or container axis which was developed in the previously described billow step is now transformed, because of the action of the plug, into orientation extending to a major extent in the axial direction. Also, in view of the enlargement of the sheet surface area due to stretching during billowing, the plug preferably does not stretch the sheet further to any substantial extent as it moves into the cavity, but rather becomes encased by the sheet as a result of the pressure in the cavity generated by the fluid which continues to enter through channels 24. However, depending on the depth and diameter of the article being formed and the amount of stretch developed in the sheet during billowing, additional axial orientation may be imparted by drawing or further stretching of the sheet through the action of the plug, as well as during the movement of the sheet from the plug to the cavity during final forming of the article. Though it is preferred, for purposes of minimizing cycle time, that the plug be encased as it is advanced into the die cavity, it is possible to move the plug into the cavity in the absence of air emitting from the die and then to turn on the air after the plug is in position within the die to cause said encasing. In any event, it is important that the sheet portion acted upon by the plug, or that portion now within the die cavity, be forced into intimate contact with surface 50 of plug 48. This may be facilitated by imposing a reduced pressure on the side of sheet S facing plug 48 via branches 58 and passage 46 in plug 48 which, as mentioned, are connected through suitable valving to a source of reduced pressure, or to the atmosphere.

Recess 62 in plug assembly 12 serves the same function as that of the previously described relieved area of the mold, but does serve to alleviate increasing the depth of the relief area on the mold side and consequently provides an improved molding feature. In other words, by providing shallow recess 62 in the plug assembly, the necessity of increasing the depth of the recessed area on the mold side for the previously mentioned purpose is avoided. Thus, the sheet thickness utilizing this approach in deep forming need not be increased, whereas, if step 30 is increased in depth and recess 62 not used, an increase in sheet thickness most likely will be required to get a comparable wall gage in the finished container.

As an essential part of the present process, the material contacting surface 50 which, in the drawings, is shown as the exterior of plug 48 but may be another means such as the surface of a conditioning cavity, is kept at a temperature within the range at which substantial molecular orientation of the thermoplastic occurs on stretching. This temperature is to be contrasted with the temperature of the sheet during billowing, the latter being such as to develop some but not a substantial amount of orientation on stretching. Accordingly, the plug surface temperature in the present process is always below the temperature of the sheet during billowing, and for the high nitrile group containing polymers of the present invention, is within the range of from 250 to 310° F. This temperature of surface 50 is controlled by temperature conditioning means associated, for example, with bore 54 of plug 48 and which is connected to a suitable on-off conventional control system. After plug 48 has been sheathed with the thermoplastic, it is essential that the sheet portion be held in contact with the plug surface for some 30 seconds until its temperature is preferably reduced to 300° F., which is within the range at which substantial orientation occurs on stretching. Though this time interval will vary with the type and thickness of material being processed and the amount of orientation desired to be generated in the final container forming step to be hereafter described, for high nitrile group containing thermoplastics, this time interval will be within the range of from 15 to 45 seconds at sheet thicknesses within the range of from 130 to 150 mils to produce a 12 ounce capacity can style container having a 25 to 30 mil wall thickness.

Figure 5:
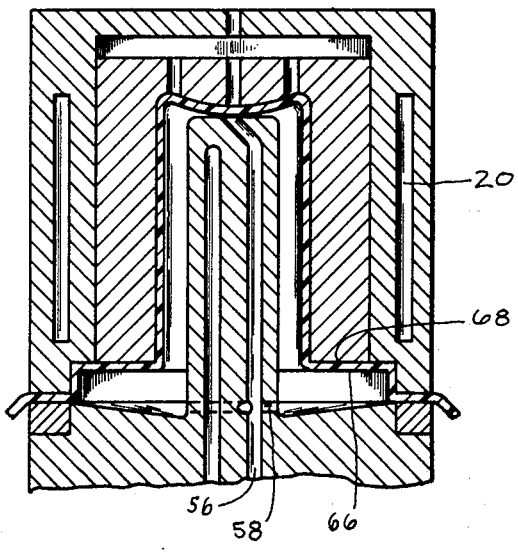

After the sheet portion within the die cavity has been reduced in temperature to that at which substantial orientation occurs on stretching, it is forced outwardly off the plug surface 50 into contact with the opposing walls of mold cavity 26 to substantially molecularly orient the thermoplastic in a circumferential direction, or in other words in the direction transverse to the axial direction. This final expansion may be achieved by introducing a fluid at a pressure of about 15–80 p.s.i.g. against the sheet through passage 56 and one or more of branches 58. Such expansion against the walls of the die cavity, of course, serves also to finish-form the container and to set the plastic to retain the orientation stresses thus introduced. Thus, with respect to the body of the container, the stretching of the sheet portion in moving from plug surface 50 to the die surface imparts substantial molecular orientation to the thermoplastic with little or no additional axial orientation, even though the distance (70 in FIG. 5) between the plug and cavity walls be relatively small, since the sheet is at a reduced temperature or in other words that at which substantial orientation occurs. After expansion against the cavity surface and setting of the thermoplastic, flash portion 68 (FIG. 5) is trimmed away from portion 66 by conventional techniques (not shown). The resulting container has a relatively balanced amount of molecular orientation therein, that in the axial direction being generated basically during the billowing step and that in the transverse direction being generated during the final article forming step. Obviously, by manipulating the temperatures of the sheet and the dimensions of the plug and cavity walls relative to each other this balance may be varied as desired.

To illustrate the effect on molecular orientation of the technique of the present invention, cylindrical containers of the type depicted in the drawings were shaped from a sheet formed from a high nitrile group containing resin blend of 98 weight percent of a copolymer containing 90 weight percent polymethacrylonitrile and 10 weight percent polystyrene, the remaining 2 weight percent in the blend comprising additives. The plug hold time while in contact with the sheet was varied utilizing a constant plug surface temperature of 280° F. and a constant initial sheet temperature of 360° F. In a first series of runs, the sheet was blown immediately off the plug surface on entering the mold, as is standard practice in thermoforming sheet material, whereas in another series of runs according to the present invention, the sheet was equilibrated to the plug surface temperature by a 30 sec. hold time prior to blowing to the mold cavity surface. Several containers from each of these series of runs were then subjected to a transversely directed compression or squeezability test in a force measuring and recording test device, model No. TM, manufactured by Instron Engineering Corp. Containers formed without sheet temperature conditioning prior to final blowing could withstand only an average 7% diameter reduction, measured in the direction of the force, before breaking due to an inherent high ratio of axial to radial orientation. Containers subjected to the dual temperature forming conditions of the present invention, tested in the same manner, exceeded an average 50 percent diameter reduction without breaking, and some reached as much as 70 percent diameter reduction prior to breaking, thus imparting a 7 to 10 fold improvement in the containers by means of the technique of the present invention, the containers in all runs being made from the same sheet gage of 140 mil nominal thickness. Also, the maximum load per unit of gauge thickness for containers formed without special sheet tempering averaged about 177 lbs./in. whereas that for the orientation balanced containers averaged 700 lbs./in. with some reaching as high as 800 lbs./in. or 4½ times the load bearing capability of those formed without sheet temperature conditioning.

The thermoplastics toward which the present invention is directed are those wherein a major component thereof has been polymerized from a monomer containing at least one nitrile group (—CN) in its molecular structure. This nitrile group bearing polymerized monomer should be present at a level of at least 60 percent by weight in the sheet thermoplastic, and preferably at a level of between 85 to 95 weight percent, in order to provide the formed article with the combination of chemical and physical properties which necessarily must be present in order that the article be effective in packaging environmentally sensitive materials. When shaping such polymers according to the technique of the present invention, the temperature of the sheet during the various stages of the process should be within the following ranges in order to obtain the desired balance of molecular orientation in the finished product: extrusion—425 to 560° F.; billow or sheet stretching—311 to 390° F.; during expansion toward mold cavity wall 250 to 310° F. The sheet temperature will vary within the limits of the aforementioned ranges depending on the level of the nitrile group containing constituent in the polymer. Generally speaking, as the level of the nitrile group containing constituent in the polymer is increased, the temperature of the sheet during the various steps of the process should accordingly be increased whereas the reverse should be done as the level is decreased toward 60 weight percent. The temperature ranges provided herein are those for compositions having a specific viscosity of between 0.06 to 0.09, such materials having been found to provide the necessary properties which should be present in container applications.

Typical of the high nitrile group containing monomers suitable for use in the thermoplastics processable according to the present invention are, for example, acrylonitrile, methacrylonitrile, ethacrylonitrile, propacrylonitrile, alphachloroacrylonitrile, alpha - bromoacrylonitrile, alpha-fluoroacrylonitrile, alpha - cyano-styrene, vinylidene cyanide, alpha-cyano acrylic acids, alpha-cyano acrylates such as alpha-cyano methyl acrylates, alpha-cyano ethyl acrylates, and the like, 2,3-dicyanobutene - 2, 1,2 - dicyanopropene-1, alpha-methylene glutaronitrile, and the like. The preferred monomers are acrylonitrile and methacrylonitrile with the latter being particularly preferred.

Any monomer or monomers which are copolymerizable with the nitrile group containing component of the polymer may be employed in the practice of this invention. Such a co-monomer is desirably, though not necessarily present, for the purpose of improving melt processing (sheet shaping) of the thermoplastic, since if there is an excess of CN groups in the polymer, the material becomes polar, the backbones tend to become attracted to each other and this accordingly reduces the melt processability characteristic of the polymer. The co-monomer tends to reduce this tendency but not sufficiently so as to destroy the barrier properties imparted by the nitrile group containing constituent. This co-monomer can be present up to a level of 40 percent by weight, 5 to 15 percent by weight being preferred. Exemplary of such monomers are ethylenically unsaturated aromatic compounds such as styrene, alpha-methyl styrene, ortho-, meta-, and para- substituted alkyl styrenes, e.g., ortho-methyl styrene, ortho-ethyl styrene, para-methyl styrene, para-ethyl styrene, ortho-, meta-, or para-propyl styrene, ortho-, meta-, or para-isopropyl styrene, ortho-, meta-, para-butyl styrene, ortho-, meta-, or para- secondary butyl styrene, ortho-, meta-, or para- tertiary butyl styrene, etc., alpha-halogenated styrene, e.g., alpha-chlorostyrene, alpha-bromostyrene, ring-substituted halogenated styrenes, e.g., ortho-chlorostyrene, para-chlorostyrene, and the like; esters of ethylenically unsaturated carboxylic acids e.g., methyl acrylate, methyl methacrylate, ethyl methacrylate, ethyl acrylate, butylacrylate, propyl acrylate, butyl methacrylate, glycidol acrylate, glycidol methacrylate, and the like, ethylenically unsaturated acids, carboxylic acids such as acrylic acid, methacrylic acid, propacrylic acid, crotonic acid, citraconic acid, and the like. Vinyl esters, e.g., vinyl formate, vinyl acetate, vinyl propionate, vinyl butyrate, etc.; vinyl and vinylidene halides, e.g., vinyl chloride, vinyl bromides, vinylidene chloride, vinyl fluorides, etc.; vinyl ethers, e.g. methyl vinyl ether, ethyl vinyl ether, alpha-olefins, e.g., ethylene, propylene, butene, pentene, hexene, heptene, octene, isobutene, and other isomers thereof.

When it is desired to provide the finished article with substantially enhanced physical properties, up to 40 percent by weight of impact modifying materials which are compatible with the high nitrile based polymer of the resin may be used. The proportion of such materials when considered with the level of non-nitrile-group containing material in the polymer should not be allowed to exceed 40 percent if radical shifts in property levels of the finished product are to be avoided. Typical impact modifiers which may be blended with the polymer of the present invention are synthetic or natural rubber components such as, for example, polybutadiene, butadiene-styrene copolymers, isoprene, neoprene, nitrile rubbers, acrylate rubbers, natural rubbers, interpolymers of butadiene with acrylonitrile, methacrylonitrile, teritary butyl styrene, styrene and mixtures thereof such as acrylonitrile-butadiene copolymers, methacrylonitrile-butadiene copolymer, acrylonitrile-styrene-butadiene terpolymers, methacrylonitrile-styrene-butadiene terpolymers, methacrylonitrile-tertiarybutyl styrene-butadiene terpolymers, acrylonitrile-tertiarybutyl styrene-butadiene terpolymers, ethylene-propylene copolymers, chlorinated or fluorinated rubbers, etc. Other tough polymers, not considered or known as rubber based materials may be used as impact modifiers. These include polycarbonate, polyethylene, polyethylene/vinyl acetate, polyethylene/vinyl alcohol, polyamides, polyketones, phenoxies, polyacetals, and silicones.

Though the process of the present invention may be employed to some advantage in shaping all types of articles, it has particular application and is preferably used in deep draw forming processes where the amount of stretching of the sheet considered with respect to the axial direction is from 1 to 6 times the shortest crosswise dimension of the formed article.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A method of forming a container for environmentally sensitive products having relatively balanced molecular orientation wherein a relatively long stretch in the axial direction and a shorter stretch in the radial direction are required, which method comprises:
    (a) supporting about its periphery a thermoplastic sheet comprising at least 60 weight percent of a polymer formed from a nitrile-group-containing monomer, the temperature of said sheet being less than the extrusion temperature of the thermoplastic and greater than the temperature at which substantial molecular orientation of the thermoplastic occurs on stretching;
    (b) billowing said sheet relative to the supported periphery to stretch the portion of said sheet within the supported periphery;
    (c) advancing a plug into said billowed sheet portion to intimately contact said stretched sheet portion and axially move it in a direction opposite to that occurring on billowing without imparting any substantial axial orientation to said thermoplastic;
    (d) bringing said sheet portion to a temperature within the range of from 250 to 310° F.; and then
    (e) forcing said sheet portion outwardly into contact with the walls of a mold cavity to form the container while substantially molecularly orienting said thermoplastic in the peripheral direction with respect to the axis of the container.

2. The process of claim 1 including the step of drawing a partial vacuum through said plug while said plug is in contact with said sheet portion to enhance said intimate contact between the plug and sheet portion.

3. The process of claim 1 including the step of clamping the portion of the sheet within its supported periphery to the surface of a mold prior to said billowing.

4. The process of claim 1 wherein the amount of stretching of said sheet portion considered with respect to the axial direction is between 1 to 6 times the shortest crosswise dimension of the formed container.

5. The process of claim 1 wherein said sheet portion is held in contact with a temperature controlled plug surface for between 15 to 45 seconds before being forced outwardly into contact with the walls of said mold cavity.

6. In a plug assist thermoforming process for forming a deep container requiring a relatively long stretch in the axial direction and a shorter stretch in the radial direction from a thermoplastic material which includes a polymer comprising at least 60 weight percent of polymerized acrylonitrile by expanding a portion of said thermoplastic material outwardly off the plug against the surface of a mold cavity, the improvement which comprises forming the container with relatively balanced orientation by forcing said thermoplastic portion in an axial direction while within a temperature range which is less than that at which the thermoplastic is extruded but greater than that at which substantial orientation occurs on stretching, to minimize development of molecular orientation in said axial direction while partially forming the container and then holding said portion in contact with a cooling medium to reduce the temperature of said thermoplastic to within the range of from 250 to 310° F. prior to expanding it against the surface of the mold cavity.

7. A method of forming a container for environmentally sensitive materials having relatively balanced molecular orientation wherein a relatively long stretch in the axial direction and a shorter stretch in the radial direction are required, which method comprises:
    (a) supporting a sheet of thermoplastic material comprising at least 60 weight percent of a polymer formed from a nitrile group containing monomer opposite the mouth of a mold having a cavity with a peripheral configuration conforming to that of said container, said sheet being at a temperature within the range of from 311 to 390° F.;

(b) clamping the sheet within its supported periphery against the surface of said mold adjacent said mouth such that a portion extends across said mouth;

(c) directing a pressurized fluid against the portion of said sheet extending across the mouth to stretch said sheet portion in a direction away from the mouth of the mold cavity and thereby impart a preselected amount of molecular orientation to said sheet in a direction which will be along the axis of said container;

(d) rapidly advancing a plug having a surface temperature in the range of from 250 to 310° F. into said stretched sheet against the portion extending across said mouth to move said portion into the cavity without contacting the cavity surface;

(e) forcing said sheet portion into intimate contact with the surface of the plug by changing the differential pressure on either side of the sheet;

(f) holding said sheet portion within the cavity in contact with said plug surface for between 5 to 45 seconds; and then (g) forcing said sheet portion outwardly from the plug surface into contact with the walls of said mold cavity to substantially molecularly orient said sheet portion in the circumferential direction while finish-forming said container.

8. The method of claim 7 wherein the thermoplastic material comprises 85 to 95 weight percent of polymerized methacrylonitrile and 5 to 15 weight percent of polymerized styrene.

References Cited

UNITED STATES PATENTS

| | | | |
|---|---|---|---|
| 3,461,503 | 8/1969 | Dockery | 18—19 F |
| 3,629,381 | 12/1971 | Walker | 264—92 |
| 3,311,684 | 3/1967 | Heider | 264—99 |
| 3,342,914 | 9/1967 | Edwards | 264—92 |
| 2,990,581 | 7/1961 | Rowe, Jr. | 264—89 |

OTHER REFERENCES

P. F. Charles, "Vacuum Systems for Thermoforming," Plastics World, April 1963, vol. 21, No. 4, pp. 34–39.

D. E. Allison and Robert Doyle, "Thermoforming Techniques for High-Density Polyolefin Sheet," Modern Plastics, June 1961, pp. 123–126, 128, 198, 202, 203, 208.

ROBERT F. WHITE, Primary Examiner

J. H. SILBAUGH, Assistant Examiner

U.S. Cl. X.R.

264—92, 94; 425—388